(12) United States Patent
Haruta

(10) Patent No.: US 6,597,342 B1
(45) Date of Patent: Jul. 22, 2003

(54) GAME MACHINE CONTROLLER

(75) Inventor: Masahiko Haruta, Koutou-ku (JP)

(73) Assignee: Aruze Corporation, Tokyo (JP)

( * ) Notice: Subject to any disclaimer, the term of this patent is extended or adjusted under 35 U.S.C. 154(b) by 0 days.

(21) Appl. No.: 09/438,047

(22) Filed: Nov. 10, 1999

(30) Foreign Application Priority Data

Nov. 13, 1998 (JP) ............................................ 10-323290

(51) Int. Cl.[7] .................................................. G09G 5/08
(52) U.S. Cl. ...................................... 345/157; 345/156
(58) Field of Search ................................. 345/156, 157, 345/158, 161, 163, 167, 173, 700, 701, 702; 463/36, 37, 38; 273/148 B

(56) References Cited

U.S. PATENT DOCUMENTS

| | | | |
|---|---|---|---|
| 4,817,950 A | * 4/1989 | Goo | 463/36 |
| 5,059,958 A | * 10/1991 | Jacobs et al. | 345/157 |
| 5,442,168 A | * 8/1995 | Gurner et al. | 463/36 |
| 5,453,758 A | * 9/1995 | Sato | 345/158 |
| 5,853,327 A | * 12/1998 | Gilboa | 463/39 |
| 6,001,017 A | * 12/1999 | Okano et al. | 463/43 |

FOREIGN PATENT DOCUMENTS

| | | |
|---|---|---|
| JP | 06050758 A | 2/1994 |
| JP | 08187359 A | 7/1996 |

* cited by examiner

*Primary Examiner*—Xiao Wu
(74) *Attorney, Agent, or Firm*—Snider & Associates; Ronald R. Snider

(57) ABSTRACT

A game machine controller operates a character of a game, such as an airplane, a robot, or the like, which carries out various movements. The controller is shaped in a form identical to the character and comprises a posture detector, whereby the controller can be moved to operate various movements of the character. Hence, even small children and the like can easily operate the character in the game without resistance.

7 Claims, 2 Drawing Sheets

GAME MACHINE CONTROLLER

RELATED APPLICATIONS

This application claims the priority of Japanese Patent Application No. 10-323290 filed on Nov. 13, 1998, which is incorporated herein by reference.

BACKGROUND OF THE INVENTION

1. Field of the Invention

The present invention relates to a game machine controller for operating various actions of characters (not only robots, humans, and the like, but also vehicles such as airplanes, cars, and the like).

2. Description of the Prior Art

In general, as controllers for operating characters in TV games and the like, the structure for adjusting the steering wheel position of a TV game input device disclosed in Japanese Unexamined Patent Publication No. 8-187359 and the input device disclosed in Japanese Unexamined Patent Publication No. 6-50758 have been known.

As the structure for adjusting the steering wheel position of a TV game input device, Japanese Unexamined Patent Publication No. 8-187359 discloses a controller for car race games. This controller has the same configuration as that of the steering wheel of an actual car, by which players of the games can feel as if they are actually driving a car.

As the input device, Japanese Unexamined Patent Publication No. 6-50758 discloses a controller which can be used in car race games. This controller uses a vibration gyroscope so as to detect the movement of a hand, and converts thus detected movement into a control signal for moving a car on a screen.

However, the controllers configured as mentioned above have the following problems:

(1) Though the structure for adjusting the steering wheel position of a TV game input device disclosed in Japanese Unexamined Patent Publication No. 8-187359 enables players to enjoy games filled with such a sense of realism that they feel as if they are actually driving a car, there are children who cannot adapt themselves to it. Namely, there are children who cannot link the operation of the steering wheel to the movement of car on the screen very well. In particular, there are many small children who cannot understand the operation with the steering wheel itself. Therefore, the controller configured similar to the actual steering wheel is not always easy for children to use.

(2) Though the input device disclosed in Japanese Unexamined Patent Publication No. 6-50758 converts the movement of a hand into a control signal, the controller is just a device to be operated while the movement on the screen is watched in this case as well. Therefore, it is not always easy for children to use this device.

SUMMARY OF THE INVENTION

In view of such problems, it is an object of the present invention to provide a game machine controller which is easily operable, in particular, by small children.

The game machine controller in accordance with the present invention is a game machine controller for operating a character which carries out various movements on a display screen; wherein the controller itself is shaped in a form identical to the character and comprises a posture detector, the controller itself being moved so as to operate various movements of the character on the display screen.

Since the controller itself is shaped like a character, so that the controller itself can be moved to operate various movements of the character on the screen, the character on the screen can be moved easily. In particular, since the movement of the character on the screen and that of the actual character (game machine controller) are synchronized with each other, the movement of the character on the screen can be felt as the movement of a real object, whereby operations become easier for those who cannot adapt themselves to games as well.

In the game machine controller in accordance with the present invention, the posture detector may comprise a gyroscope for detecting the movement of the controller itself, detect the movement of the controller itself, and convert thus detected movement into a control signal for moving, similarly thereto, the character on the display screen.

In this configuration, a movement aimed for the character on the screen is carried out with respect to the controller itself. As a consequence, the movement of the controller itself is detected, and a control signal for moving the character similarly thereto is produced.

The gyroscope may detect frontward/rearward tilting and/or rightward/leftward tilting of the controller.

In this case, the game machine controller may detect the frontward/rearward tilting and/or rightward/leftward tilting of the controller by calculating an angular velocity and/or angular acceleration of the controller at a predetermined position according to an output from the gyroscope.

For example, the controller is shaped like a scaled-down model airplane or a model robot.

DESCRIPTION OF THE PREFERRED EMBODIMENTS

In the following, the game machine controller in accordance with the present invention will be explained with reference to the accompanying drawings.

Figure 1:
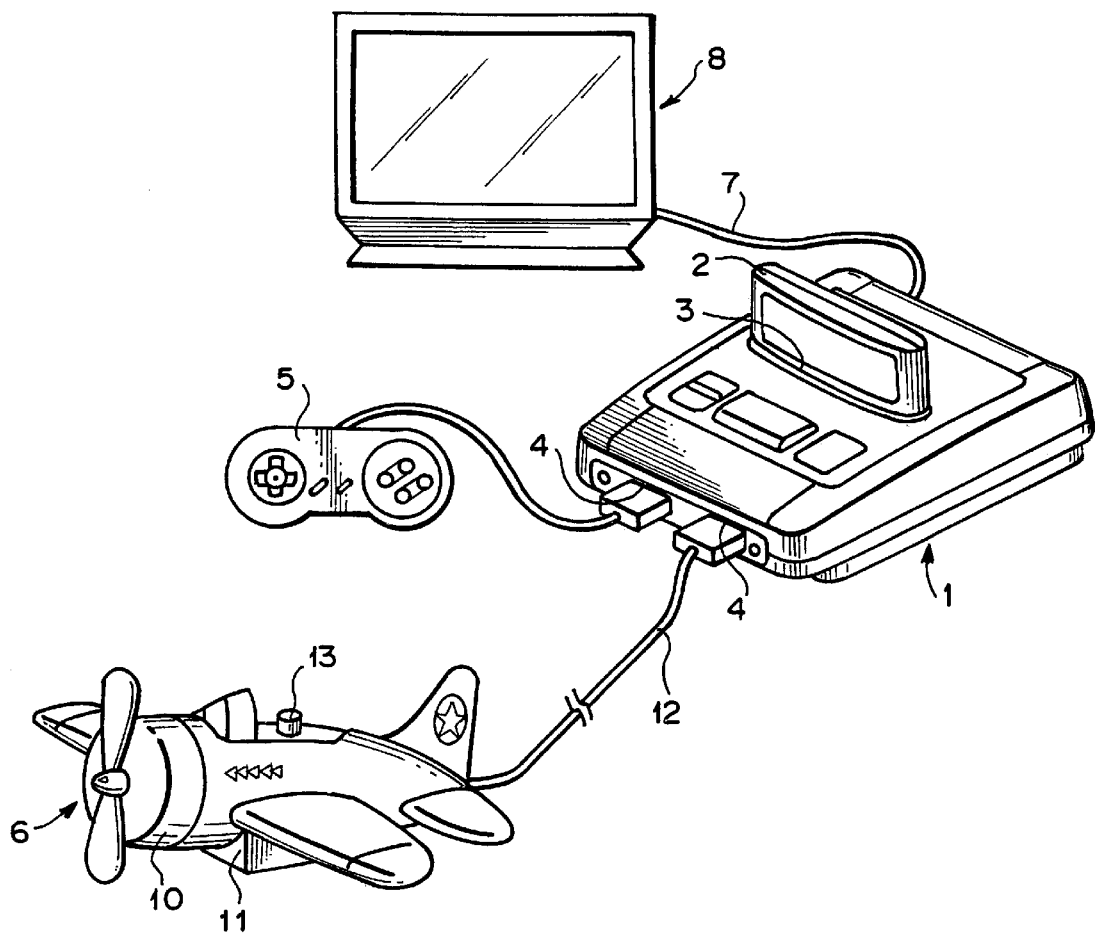
FIG. 1 is a perspective view showing the overall configuration of a TV game machine in accordance with a first embodiment of the present invention.
Figure 2:
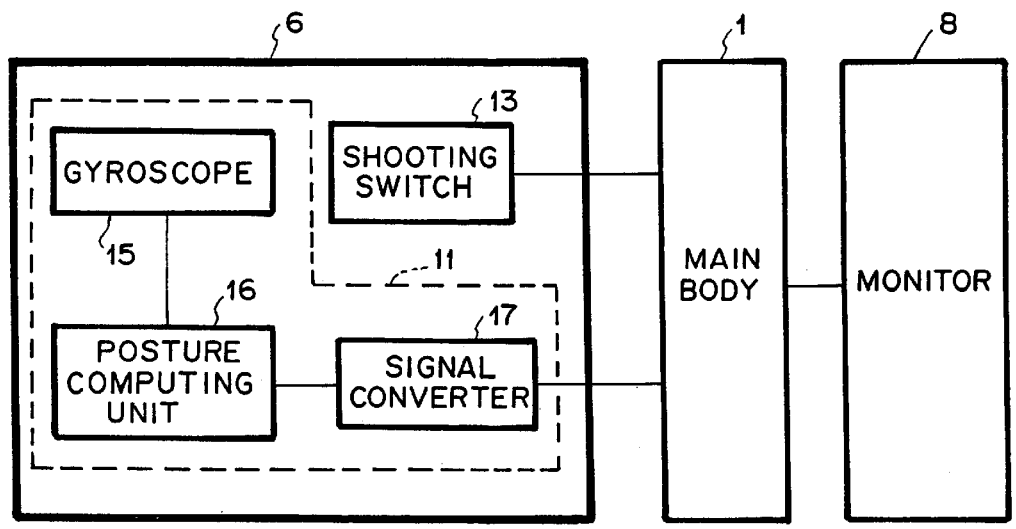
FIG. 2 is a functional block diagram of the TV game machine in accordance with the first embodiment of the present invention.

FIG. 1 is a perspective view showing a state where the game machine controller in accordance with a first embodiment of the present invention is connected to a typical game machine for TV games, PC games, and the like. FIG. 2 is a functional block diagram of the game machine shown in FIG. 1.

In FIG. 1, "1" indicates the main body of the game machine. Formed in the upper face of the main body 1 is a slot 3 for inserting a game cartridge 2 on which the contents of a game are recorded. The front face of the main body 1 is provided with two controller-connecting terminals 4. A common controller 5 is connected to one of the controller-connecting terminals 4, whereas a game machine controller 6 in accordance with this embodiment is connected to the other. Further, the main body 1 is connected to a monitor 8 by way of a connecting cable 7.

The game machine controller 6 is shaped like an airplane so as to correspond to an airplane game. This game machine controller 6 is mainly composed of a main body 10, a posture detector 11, a connecting cable 12, and a shooting switch 13.

The controller main body 10 is shaped similarly to an airplane as a character in the game stored in the game cartridge 2, and is adapted to operate the movement of the airplane displayed on the monitor 8 in synchronization with the movement of the actual model airplane.

The posture detector 11 is located on the lower side of the controller main body 10. The posture detector 11 is adapted to detect the rightward/leftward tilting and frontward/rearward tilting of the controller main body 10. The rightward/leftward tilting of the controller main body 10 detected by the posture detector 11 is converted into a signal commanding the airplane on the screen to turn rightward or leftward. Further, the magnitude of the rightward/leftward tilting of the controller main body 10 is converted, as it is, into a signal indicative of the magnitude of tilting upon the rightward/leftward turn of the airplane on the screen. Together with the magnitude of the rightward/leftward tilting, the angular velocity and angular acceleration upon tilting the controller main body 10 are converted into a signal indicative of the speed of the rightward/leftward turn (fast or slow turn). On the other hand, the frontward/rearward tilting of the controller main body 10 is converted into a signal commanding the airplane to descent or ascend. The magnitude of this tilting is converted, as it is, into a signal indicative of the magnitude of tilting upon the descent or ascent of the airplane. Together with the magnitude of the forward/rearward tilting, the angular velocity and angular acceleration upon tilting the controller main body 10 are converted into a signal indicative of the speed of forward/rearward tilting of the airplane (fast descent/ascent or slow descent/ascent).

Specifically, as shown in FIG. 2, the posture detector 11 is constituted by a gyroscope 15, a posture computing unit 16, and a signal converter 17.

The gyroscope 15 detects the tilting of the controller main body 10. According to the value detected by the gyroscope 15, the posture computing unit 16 computes tilting angles of the controller main body 10 in forward/rearward and rightward/leftward directions and an angular velocity and angular acceleration at the time of tilting. As a consequence, the posture of the controller main body 10 and the speed at which the controller main body 10 is tilted, i.e., whether it is tilted slowly or rapidly, are computed. For this computation, a general computing method using differentiation, integration, and the like is employed. The signal converter 17 converts the computed value from the posture computing unit 16 into a control signal for controlling the airplane on the display, and outputs this control signal to the game machine main body 1. Namely, the tilting angle and tilting speed at the time when the airplane-shaped controller 6 is tilted in order to operate the airplane displayed on the monitor 8 according to the movement thereof are converted, as they are, into the control signal for operating the airplane on the screen, and thus obtained control signal is outputted to the game machine main body 1.

The shooting switch 13 is a switch for firing machine guns, missiles, and the like. In combat games, the shooting switch 13 is pressed when an opponent airplane is found, so as to fire machine guns, missiles, and the like toward the opponent airplane.

Thus configured TV game machine will operate as follows.

Children who are accustomed to playing the game handle the common controller 5 to operate the airplane on the screen while watching the monitor 8.

Children who cannot handle the common controller 5 well, such as those who are not accustomed to the game, small children, and the like, use the airplane-shaped controller 6. This controller 6 is operated so as to tilt frontward/rearward and rightward/leftward according to the movement of the airplane on the screen. For example, when the controller 6 is tilted rightward, the gyroscope 15 and posture computing unit 16 of the posture detector 11 compute the tilted angle and the speed and acceleration of tilting. According to the computed value from the posture computing unit 16, the signal converter 17 outputs a control signal to the game machine main body 1. As a consequence, the airplane on the screen of the monitor 8 turns rightward. At this time, the airplane turns rapidly and slowly respectively when the controller 6 is tilted rapidly and slowly.

If the airplane on the screen is to be turned leftward, then the controller 6 is turned leftward. If the airplane on the screen is to be moved up, then the nose of the controller 6 is tilted upward. If the airplane on the screen is to be moved down, then the nose of the controller 6 is tilted downward. These movements are detected by the posture detector 11, and the airplane on the screen is operated as in the operation mentioned above.

Since the controller 6 is shaped identical to an airplane which is a character in a game, even children who are not accustomed to the game, small children, and the like can easily operate the character in the game without resistance.

In particular, since the movement of the character on the screen and the movement of the actual character (controller 6) synchronize with each other, the movement of the character on the screen can be felt as the movement of a real object. Small children often carry a model airplane by hand and fly the airplane in their own imaginary space while uttering a buzzing sound. They can enjoy TV games while feeling as if they fly an airplane in their own imaginary space. As a result, operations become easier for those who are not accustomed to games as well.

Though the above-mentioned embodiment is explained in terms of TV games by way of example, the present invention is not restricted thereto and may be used in other types of game machines such as those for PC games and the like. Operations and effects similar to those mentioned above are obtained in such cases as well.

Though the above-mentioned embodiment explains the case where the game machine controller 6 is shaped like an airplane by way of example, the present invention is not restricted thereto. When the controller 6 is shaped in conformity to various kinds of characters in games, operations and effects similar to those of the above-mentioned embodiment can be obtained.

Figure 3:
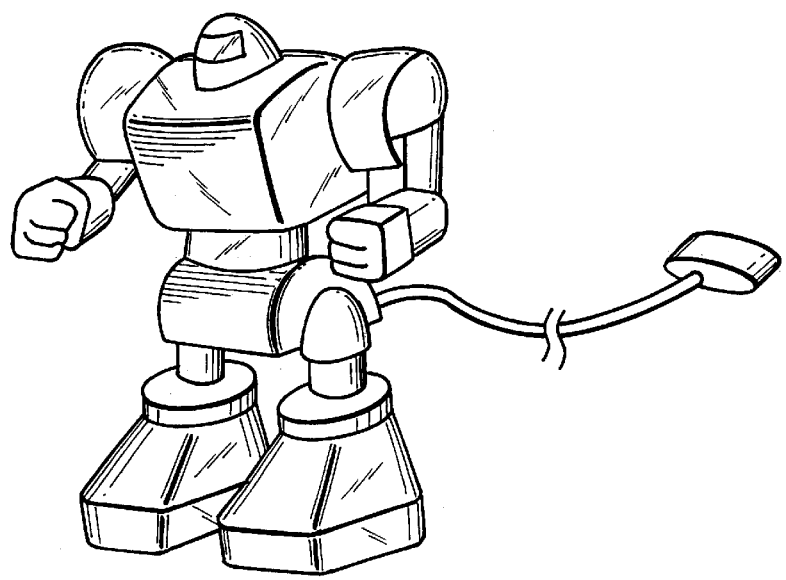
FIG. 3 is a perspective view showing a modified example of the present invention.

For example, in the case where the game machine controller is shaped like a robot in conformity to a character of a game as shown in FIG. 3, operations and effects similar to those of the above-mentioned embodiment are obtained. In this case, in addition to the forward/rearward and rightward/leftward tilting, such parts as hands, feet, a neck, and the like are adapted to move. Hence, these parts may be provided with an angular sensor (rotational displacement sensor) so as to detect pivoting angles of the hands, feet, neck, and the like, and operate a robot on the screen.

Also, the present invention is similarly applicable to human characters.

In the case of a car or the like, on the other hand, the angle by which the game machine controller is tilted and the rotating angle of the steering wheel are synchronized with each other. For the brake and accelerator, their respective switches may be provided, or the game machine controller may be set such that braking and acceleration are attained respectively when the controller is tilted forward and rearward. Operations and effects similar to those in the above-mentioned embodiment are obtained in this case as well.

As explained in detail in the foregoing, the present invention yields the following advantageous effects.

Since the game machine controller itself is shaped in a form identical to a character in a game and comprises a posture detector, and the controller itself is moved so as to operate various movements of the character, even children who are not accustomed to the game, small children, and the like can easily operate the character in the game without resistance.

In particular, since the movement of the character on the screen and the movement of the actual character (game machine controller 6) synchronize with each other, the movement of the character on the screen can be felt as the movement of a real object, whereby operations become easier for those who cannot adapt themselves to the game as well.

What is claimed is:

1. A game machine controller for operating a character which carries out various movements on a display screen;

wherein said controller is shaped in a form similar to said character and comprises a posture detector, wherein said controller is moved to operate various movements of said character on said display screen, wherein said posture detector comprises a gyroscope for detecting magnitude of rightward or leftward tilting of the controller and a converter which converts the detected movement into a signal indicative of tilting of a rightward or leftward turn of the character on the display screen, and wherein the magnitude of the riahtward/leftward tilting, an angular velocity and an angular acceleration upon tilting of the controller are converted into a signal indicative of the speed of the rightward/leftward turn of the character on the display screen.

2. A game machine controller according to claim 1, wherein said controller is shaped like a scaled-down model airplane.

3. A game machine controller according to claim 1, wherein said controller is shaped like a model robot.

4. A game machine controller according to claim 1, wherein a posture computer unit computes tilting angles of the controller in a rightward or leftward direction and an angular velocity and angular acceleration at the time of tilting of the controller.

5. A game machine controller for operating a character which carries out various movements on a display screen;

wherein said controller is shaped in a form similar to said character and comprises a posture detector, wherein said controller is moved to operate various movements of said character on said display screen and, wherein said posture detector comprises a gyroscope for detecting magnitude of forward or rearward tilting of the controller and a converter which converts the detected movement into a signal indicative of tilting of forward or rearward movement of the character on the display screen, and wherein the magnitude of the forward or rearward tilting, an angular velocity and an angular acceleration upon tilting of the controller are converted into a signal indicative of the speed of forward or rearward movement of the character on the display screen.

6. A game machine controller according to claim 5, wherein a posture computer unit computes tilting angles of the controller in a forward or rearward direction and an angular velocity and angular acceleration at the time of movement of the controller.

7. A game machine controller according to claim 5, wherein said controller is shaped like a model robot.

* * * * *

UNITED STATES PATENT AND TRADEMARK OFFICE
CERTIFICATE OF CORRECTION

PATENT NO.     : 6,597,342 B1
DATED          : July 22, 2003
INVENTOR(S)    : Masahiko Haruta It is certified that error appears in the above-identified patent and that said Letters Patent is hereby corrected as shown below:

<u>Column 5,</u>
Line 36, delete the phrase "riahtward/leftward" and substitute therefore
-- rightward/leftward --.

Signed and Sealed this

Seventh Day of October, 2003

JAMES E. ROGAN
*Director of the United States Patent and Trademark Office*